(12) United States Patent
Priller et al.

(10) Patent No.: US 7,976,249 B2
(45) Date of Patent: Jul. 12, 2011

(54) SIDE MILLING CUTTER FOR MANUFACTURING A STONE OR ROCK DRILL, A METHOD OF MANUFACTURING A STONE OR ROCK DRILL WITH A SIDE MILLING CUTTER, AND A SIDE MILLING CUTTER AND A CUTTING INSERT THEREFOR

(75) Inventors: Franz Priller, Gaming (AT); Alfred Sladek, Fuerth (DE)

(73) Assignee: Kennametal Inc., Latrobe, PA (US)

( * ) Notice: Subject to any disclaimer, the term of this patent is extended or adjusted under 35 U.S.C. 154(b) by 1027 days.

(21) Appl. No.: 11/620,412

(22) Filed: Jan. 5, 2007

(65) Prior Publication Data

US 2007/0201959 A1     Aug. 30, 2007

Related U.S. Application Data (63) Continuation-in-part of application No. PCT/EP2005/007029, filed on Jun. 30, 2005.

(30) Foreign Application Priority Data

Jul. 6, 2004   (DE) .................. 20 2004 010 630

(51) Int. Cl.
    *B23C 5/22* (2006.01)
(52) U.S. Cl. .......................................... 407/53; 407/113
(58) Field of Classification Search .............. 407/33–35, 407/40–43, 47, 49, 113, 101
    See application file for complete search history.

(56) References Cited

U.S. PATENT DOCUMENTS

| 87,985 | A | * | 3/1869 | Stephens ........................ 407/43 |
| 3,742,565 | A | * | 7/1973 | Boboltz et al. ................. 407/46 |
| 3,776,289 | A | * | 12/1973 | Boboltz et al. ................ 144/230 |
| 4,529,338 | A | * | 7/1985 | Erkfritz ........................... 407/35 |
| 6,247,389 | B1 | * | 6/2001 | Samuels et al. .................... 83/13 |
| 6,709,205 | B2 | | 3/2004 | Morgulis et al. |
| 6,997,650 | B2 | * | 2/2006 | Voigt et al. ...................... 407/35 |
| 7,281,884 | B2 | * | 10/2007 | Maeda et al. ................... 407/113 |

FOREIGN PATENT DOCUMENTS

| DE | 25 49 757 A1 | 5/1977 |
| DE | 25 49 930 A1 | 5/1977 |
| DE | 34 13 615 A1 | 10/1985 |
| DE | 3413615 A1 * | 10/1985 |
| DE | 197 27 872 A1 | 1/1999 |
| EP | 0 827 818 A | 3/1998 |
| EP | 827818 A2 * | 3/1998 |
| JP | 08 206910 A | 8/1996 |
| WO | WO 03/033195 A1 | 4/2003 |

OTHER PUBLICATIONS

EP0827818A2 english translation.*
International Search Report PCT/EP2005/007029 and English Translation thereof.
German Office Action 20 2004 010 630.2.

* cited by examiner

*Primary Examiner* — Boyer D Ashley
*Assistant Examiner* — Sara Addisu
(74) *Attorney, Agent, or Firm* — Larry R. Meenan (57) ABSTRACT

Side milling cutter for manufacturing a stone or rock drill in which the cutting inserts each have a bearing lug with sloped sides, as well as a method of manufacturing a stone or rock drill with such a side milling cutter, and a cutting insert therefor having a bearing lug with sloped sides.

20 Claims, 9 Drawing Sheets

SIDE MILLING CUTTER FOR MANUFACTURING A STONE OR ROCK DRILL, A METHOD OF MANUFACTURING A STONE OR ROCK DRILL WITH A SIDE MILLING CUTTER, AND A SIDE MILLING CUTTER AND A CUTTING INSERT THEREFOR

CONTINUING APPLICATION DATA

This application is a Continuation-In-Part application of International Patent Application No. PCT/EP2005/007029, filed on Jun. 30, 2005, which claims priority from Federal Republic of Germany Patent Application No. 20 2004 010 630.2, filed on Jul. 6, 2004. International Patent Application No. PCT/EP2005/007029 was pending as of the filing date of this application. The United States was an elected state in International Patent Application No. PCT/EP2005/007029.

BACKGROUND

1. Technical Field

The present application relates to a side milling cutter for manufacturing a stone or rock drill, a method of manufacturing a stone or rock drill with a side milling cutter, and a side milling cutter and a cutting insert therefor. The present application also relates to a milling tool comprising a tool base body and a number of cutting plates held to the base body by a corresponding clamping element.

2. Background Information

Due to the increasing requirements imposed on technical components or workpieces manufactured by metal cutting, there is a demand not only for a particularly high surface quality, but also for a particularly efficient application of the milling tool. In particular in the case of a side milling cutter for metal-cutting machining of, for example, a stone drill, it is desired to have the largest possible number of cutting plates arranged on and distributed over the circumference of a disk-shaped tool base body, which, on the one hand, can be exchanged in the simplest possible way and, on the other hand, offer an application or use that is as efficient as possible.

OBJECT OR OBJECTS

It is the object of at least one possible embodiment to provide a milling tool which can be applied as efficiently as possible and which enables a particularly flexible utilization of cutting plates of an application-specific design.

SUMMARY

This object can be achieved according to at least one possible embodiment through a milling tool comprising a tool base body and a number of cutting plates held to said base body by means of a clamping element. The cutting plates each have a plate surface disposed in opposite planes and at least one lateral surface forming a cutting edge with a first plate surface. There is also a geometrical bearing lug protruding from the cutting plate opposite to the first plate surface, which bearing lug brings the cutting plate into a form fit with the corresponding contour support in the tool base body, wherein the geometrical bearing lug forms a contour bearing surface, which is crosswise at an axial angle between 5° and 15°, to a back surface, which is parallel to the first plate surface. For this purpose, the base body of the milling tool and the, or each, cutting plate held to it are designed in such a way that a geometrical bearing lug protrudes from one of their plate surfaces, which brings the cutting plate into a form fit with a corresponding contour support in the tool base body.

At least one possible embodiment is based on the consideration that cutting plates provided for individual milling profiles and having different, even asymmetric, cutting-edge contours can be used on the same tool base body, if the cutting plate possesses a bearing surface for the purpose of mounting the cutting plate in the tool that is independent of the cutting geometry. This bearing surface should be a geometrical contour bearing surface or support which is independent of the cutting or cutting-face geometry of the cutting plate. This could be achieved by the fact that also cutting plates with an asymmetric cutting-edge contour could always possess the same geometrical lug as a contour bearing surface, which will then correspond with a support geometry in the tool base body.

By designing the cutting plate with such a geometrical bearing lug, the cutting plate can advantageously be multi-edged. The cutting plate could have, for example, four or six lateral surfaces, which will then form with a (first) plate surface opposite to the geometrical lug, also referred to herein as a cutting-face side, a corresponding number of cutting edges. This principle of the multi-edged cutting plate with a dome-like or plateau-like geometrical bearing lug provided on the rear side of the cutting plate which is opposite to a cutting-face side can be realized both in a side milling cutter with a multitude of cutting plates arranged on the circumference of its disk-shaped tool base body, and in a milling tool with a rod-like or arbor-like tool base body.

In another possible embodiment, the geometrical bearing lug forms a back surface which is parallel to the opposite (first) plate surface or cutting-face side and a step-like or collar-like contour support with a number of bearing surfaces corresponding to the number of cutting edges. In one possible embodiment, this contour support does not run at right angles or perpendicularly to the back surface or to the cutting-face side which is parallel to said back surface, but only approximately crosswise to it, at an axial angle. This axial angle can deviate from the crosswise course, or from the course at right angles, by 5° to 15°, or possibly by (7±1)°. This axial angle is adapted to the lead angle at which the cutting plate is mounted in the tool base body, inclined to the latter's axis.

In at least one other possible embodiment, the axial angle and the lead angle are not adapted to one another. The axial angle can be different from the lead angle by a whole degree or degrees, or even a tenth of a degree or tenths of a degree. In addition, according to at least one possible embodiment, the lead angle and/or the axial angle could be in the range of 0° to 20°, such as 0°, 1°, 2°, 3°, 4°, 5°, 6°, 7°, 8°, 9°, 10°, 11°, 12°, 13°, 14°, 15°, 16°, 17°, 18°, 19°, or 20°, and values in between in tenths of a degree, or possibly even hundredths of a degree.

In yet another possible embodiment, the back surface of the bearing lug is not parallel to the opposite plate surface of the cutting face side of the cutting plate. Either surface could be deviated from a parallel position by a whole degree or degrees, or even a tenth of a degree or tenths of a degree. According to at least one possible embodiment, the deviation could be in the range of 0° to 20°, such as 0°, 1°, 2°, 3°, 4°, 5°, 6°, 7°, 8°, 9°, 10°, 11°, 12°, 13°, 14°, 15°, 16°, 17°, 18°, 19°, or 20°, and values in between in tenths of a degree, or possibly even hundredths of a degree.

This contour support of the geometrical bearing lug, which is inclined by the axial angle, makes it possible in a simple as well as reliable manner to exactly position axially freely clamped multi-edged cutting plates by means of a plane-bearing tool. For this purpose, this plane-bearing tool, which is detachably braced with the tool base body when the multi-edged cutting plates are being mounted, synchronously acts with bearing studs, which are parallel to its plane surface, on the geometrical bearing lugs of the cutting plates. In this way, the cutting plates can be precisely positioned and detachably fixed to the tool base body substantially simultaneously, practically by one operation.

For positioning and fixing the, or each, cutting plate to the tool base body, a clamping element in the form of a clamping wedge can be provided. This wedge comprises a first clamping surface, to which a bearing surface provided on a clamping web of the tool base body is opposite, under formation of a clamping slot for the cutting plate. The back surface, formed by the geometrical bearing lug, of the cutting plate abuts on said bearing surface. In at least one embodiment, the clamping wedge includes a through hole for a fixing screw. For this purpose, in at least one embodiment a double-threaded screw is provided, so that then the clamping wedge possesses an internal thread for the double-threaded screw guided in a threaded hole of the tool base body. For detachably fastening the cutting plate to the tool base body, a clamping claw or the like can also be provided.

In another possible embodiment, a double clamping wedge with opposite clamping surfaces is provided as a clamping element. The double clamping wedge allows the substantially simultaneous clamping fixation of two cutting plates. In this embodiment, the back surface, formed by the geometrical bearing lug, of the cutting plate has in a way a double function, serving either as a bearing surface or as a clamping surface, depending on the position of the cutting plate. One of the clamping surfaces of the double clamping wedge abuts on the cutting-face side of the cutting plate, while then the back surface of the cutting plate, formed by the geometrical bearing lug, serves as a bearing surface. The cutting-face side of the other cutting plate fixed by clamping by means of the double clamping wedge then abuts on the bearing surface of the clamping web of the tool base body, while the back surface, formed by the geometrical bearing lug, of this cutting plate serves as a clamping surface cooperating with the double clamping wedge.

In at least one possible embodiment, due to the design of a cutting plate with a geometrical bearing lug, with which the cutting plate is brought into a form fit with a corresponding contour support in the tool base body, it is possible for multi-edged cutting plates of the type of so-called indexable cutting plates to also be used, even with asymmetric cutting or cutting-face geometry. Furthermore, in case of a side milling cutter, these can be clamped in an axially free manner in the tool base body. In this way, essentially the same tool base body can be used for cutting inserts differing in their cutting geometry and the multi-edged cutting inserts can be used several times.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentably and non-obvious one with respect to the other.

DESCRIPTION OF EMBODIMENT OR EMBODIMENTS

Corresponding parts are marked by the same reference numbers in all figures.

Figure 1:
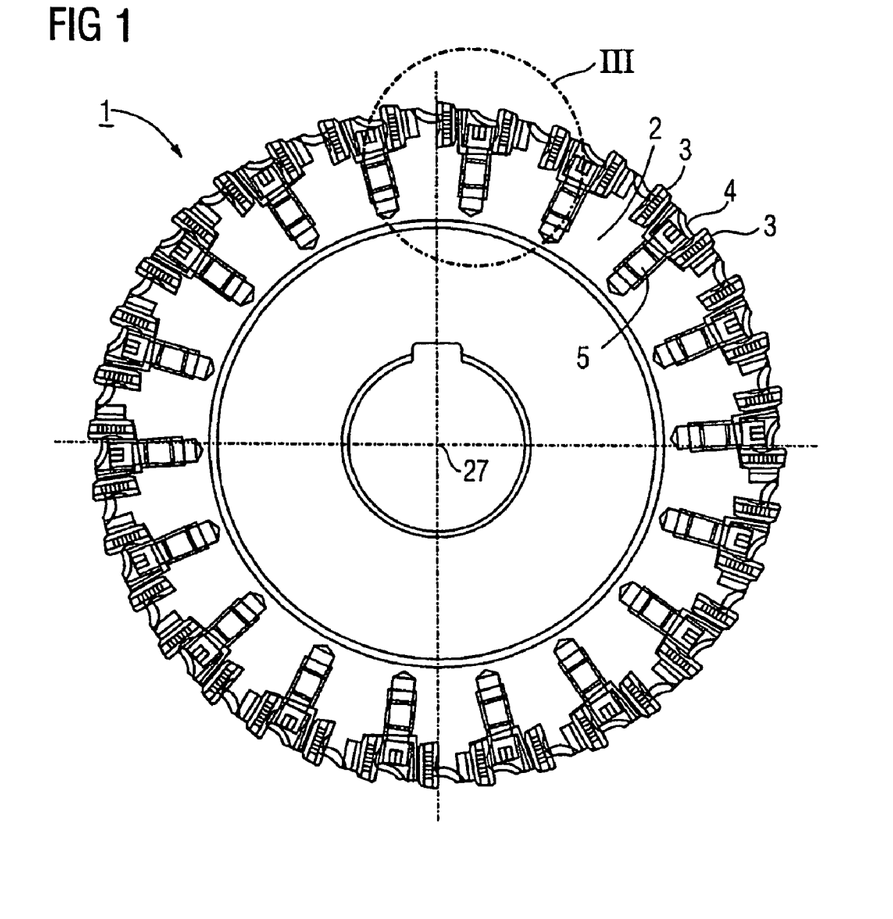
FIGS. 1 and 2 are a side view and a top view, respectively, of a milling tool according to at least one possible embodiment with a disk-shaped tool base body and multi-edged cutting plates held to it.
Figure 2:
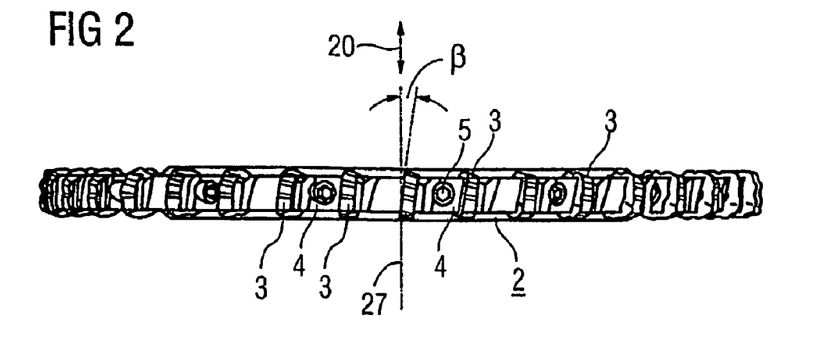
Figure 3:
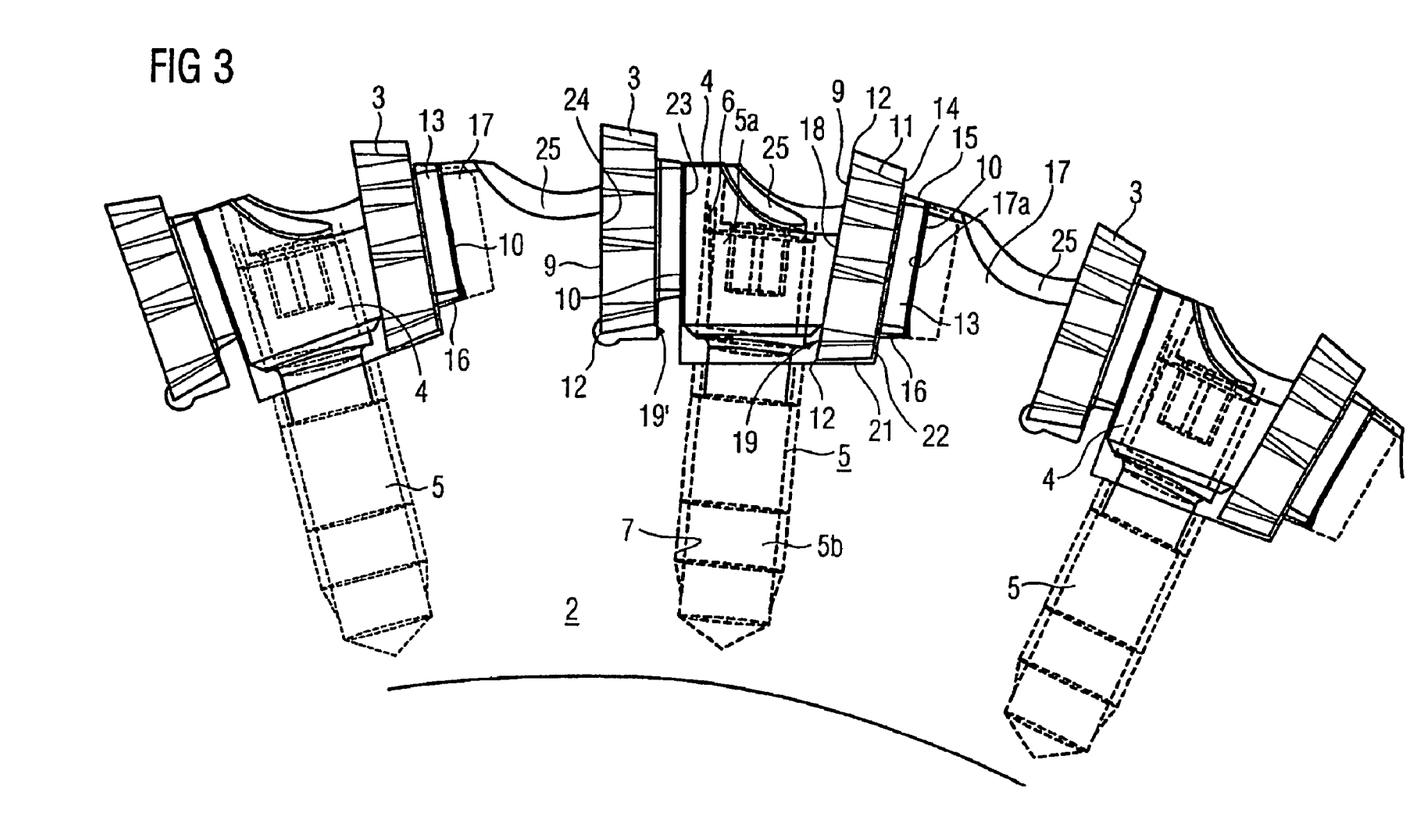
FIG. 3 is a detail III of FIG. 1 at an enlarged scale with a clamping fixation of the cutting plates by means of a double clamping wedge.

FIGS. 1 to 3 show the milling tool 1, in the following referred to as side milling cutter, with a disk-shaped tool base body 2, on the outer circumference of which a multitude of cutting plates 3 are arranged and regularly distributed. Two cutting plates 3 each are detachably fixed by clamping to the tool base body 2 by means of a double clamping wedge 4. The detachable fixation of the cutting plates 3 on the tool base body 2 is effected in the exemplary embodiment by means of double-threaded screws 5 which partly penetrate the clamping wedge 4 and which are designed as hexagon socket screws.

According to FIG. 3, the threaded head 5a of the double-threaded screw 5 is screwed, on the one hand, into a corresponding internal thread 6 in the clamping wedge 4, and the threaded shank 5b of the double-threaded screw 5 is screwed into a threaded hole 7 provided in the tool base body 2.

Figure 4:
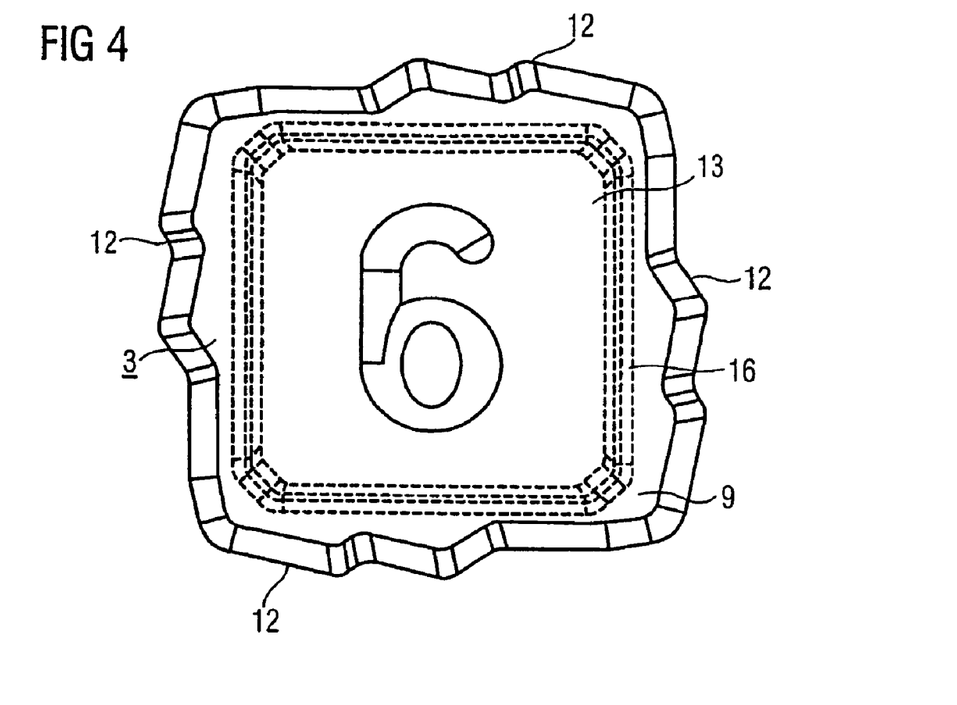
FIGS. 4 and 5 are a front view and a side view, respectively, of a multi-edged cutting plate according to at least one possible embodiment.
Figure 5:
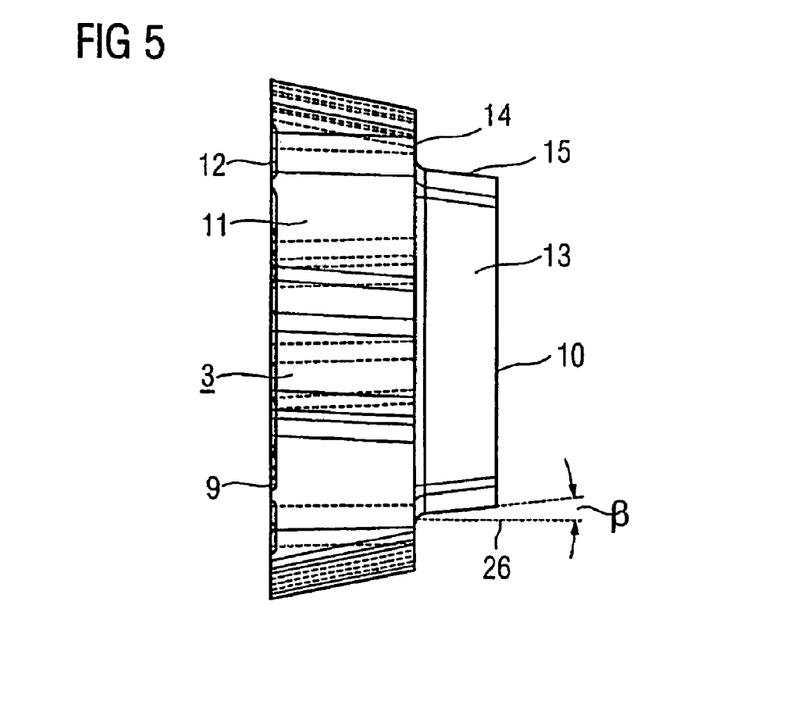

As is also evident from FIGS. 4 and 5, the cutting plate 3 comprises in each of its opposite planes a plate surface 9, 10, as well as a number of, in the exemplary embodiment, four, lateral surfaces 11. Each of the lateral surfaces 11 forms with the first plate surface 9 of the cutting plate 3, in the following referred to as cutting-face side, a cutting edge 12. Thus, the—in the exemplary embodiment four-sided—cutting plate 3 comprises on its circumference four cutting edges 12 with individual, but similar edge contour. The cutting plate 3 shown in FIG. 4 serves, for example, for producing or cutting helical chip spaces into rock drills.

The cutting plate 3 comprises a geometrical bearing lug 13 forming a back surface 10, which is parallel to, and opposite to, the cutting-face side 9, as a second plate surface. Furthermore, the geometrical bearing lug 13, which is preferably integrally formed onto the cutting plate 3 and which protrudes in a dome-like manner over a rear side 14 of the cutting plate 3, which is opposite to the cutting-face side 9 and, therefore, to the cutting edges 12, forms a step-like or collar-like contour support with corresponding bearing or plane bearing surfaces or side bearing surfaces 15. This contour support 15, forming the plane bearing surfaces of the multi-edged cutting plate 3, as well as the back surface 10 of the geometrical bearing lug 13 of the cutting plate 3 are brought into a form fit with a corresponding contour support 16 of the tool base body 2. The combination of the cutting plate 3 and the bearing lug 13 defines a cutting insert.

A clamping web 17 integrally formed onto the tool base body 2 includes a corresponding bearing surface 17a, on which the back surface 10, formed by the geometrical bearing lug 13, of the cutting plate 3 abuts. Through this bearing surface 17a on the clamping web 17 of the tool base body 2 and with the contour support 16, the contour bearing surface or contour support corresponding with the geometrical bearing lug 13 is formed on the tool base body 2. In this way, a clamping slot or gap 19 is formed for the cutting plate 3 to be clamped in an axially free manner, between a first clamping surface 18, facing the cutting-face side 9, of the clamping wedge 4 and the bearing surface 17a of the clamping web 17 of the tool base body 2. The respective cutting plate 3 can be inserted from the side in axial direction 20 (FIG. 2) into this clamping slot 19 of the tool base body 2. According to at least one possible embodiment, the areas between adjacent clamping webs 17 are considered receiving pockets, which have a first side surface, a second side surface, and a bottom surface.

As is evident from FIG. 3, both the lateral surface 11, facing the tool base body 2, of the cutting plate 3 and, with a clearance, the cutting edge 12 provided in that place are brought into a form fit with a holding groove 21 in the tool base body 2. This holding groove 21 runs over a stepped contour 22 into the contour support or support surface 16, so that only the geometrical bearing lug 13 of the cutting plate 3 abuts on the tool base body, while the cutting edge 12, which is brought into a form fit there, does not have any contact with the tool base body 2.

The double clamping wedge 4 serves for clamping fixation of two multi-edged cutting plates 3 with asymmetrical cutting geometry, which are evident from FIG. 4. For this purpose, the further clamping surface 23, which is opposite to the clamping surface 18, of the double clamping wedge 4 abuts on the back surface 10 of the further cutting plate 3, which is brought into a form fit with a corresponding clamping slot 19' in the tool base body 2. Here, the back surface 10, which is parallel to the cutting-face side 9, of the cutting plate 3 serves as a clamping surface, whereas the back surface 10 of the other cutting plate 3, which is fixed by the same double clamping wedge 4, serves as a bearing surface. Analogously, the cutting-face side 9 of the respective cutting plate 3 acts in mounted condition on the one hand as a bearing surface on a corresponding clamping surface 24 of the clamping web 17, whereas the cutting-face side 9 of the other cutting plate 3 acts as a clamping surface.

Both the, or each, double clamping wedge 4 and the clamping webs 17 are provided with a chip space 25 inclined towards the cutting-face side 9 of the respective cutting plate 3, in which the chip generated by the milling operation can run off.

As is relatively evident from FIG. 5, the contour support 15 of the geometrical bearing lug 13 of the cutting plate 3 is square and has a conical or wedge-shaped design, forming four similar or same plane bearing surfaces. The geometrical shape of the geometrical bearing lug 13 of the cutting plate 3 can be polygonal, e.g. hexagonal. It deviates by an axial angle $\beta$ from the vertical line 26 which is perpendicular to the cutting-face side 9 and to the back surface 10. This angle $\beta$ has a value between 5° and 15°, expediently 6° to 10°, preferably 7°.

The axial angle $\beta$ is equal to the lead angle $\beta$ shown in FIG. 2, at which the respective cutting plate 3 is inclined against the tool axis or central rotational axis 27 of the tool base body 2. This inclination enables the engagement of only the cutting edge 12 of the cutting plate 3 when the latter machines a workpiece (not shown), so that the lateral surfaces 11, which in mounted condition in the tool base body 2 precisely do not serve as a plate bearing surface, serve as a cutting surface for the respective cutting edge or main cutting edge 12 which is in cutting action.

Figure 6:
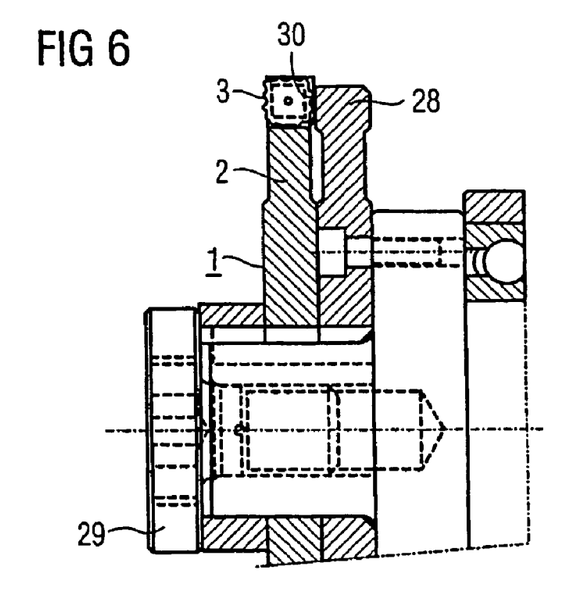
FIG. 6 is a section of a detail of the milling tool detachably screwed together with a plane-bearing tool, with cutting plates being clamped in an axially free manner.
Figure 7:
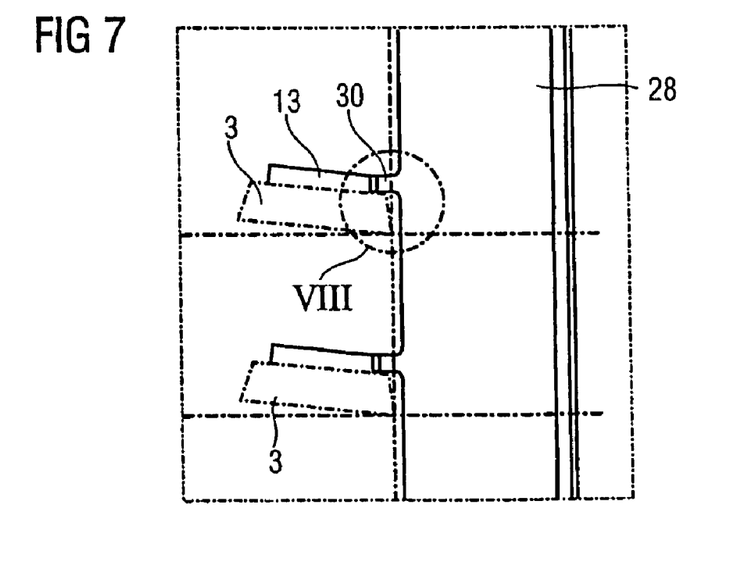
FIG. 7 is a top view of the plane-bearing tool according to FIG. 6.
Figure 8:
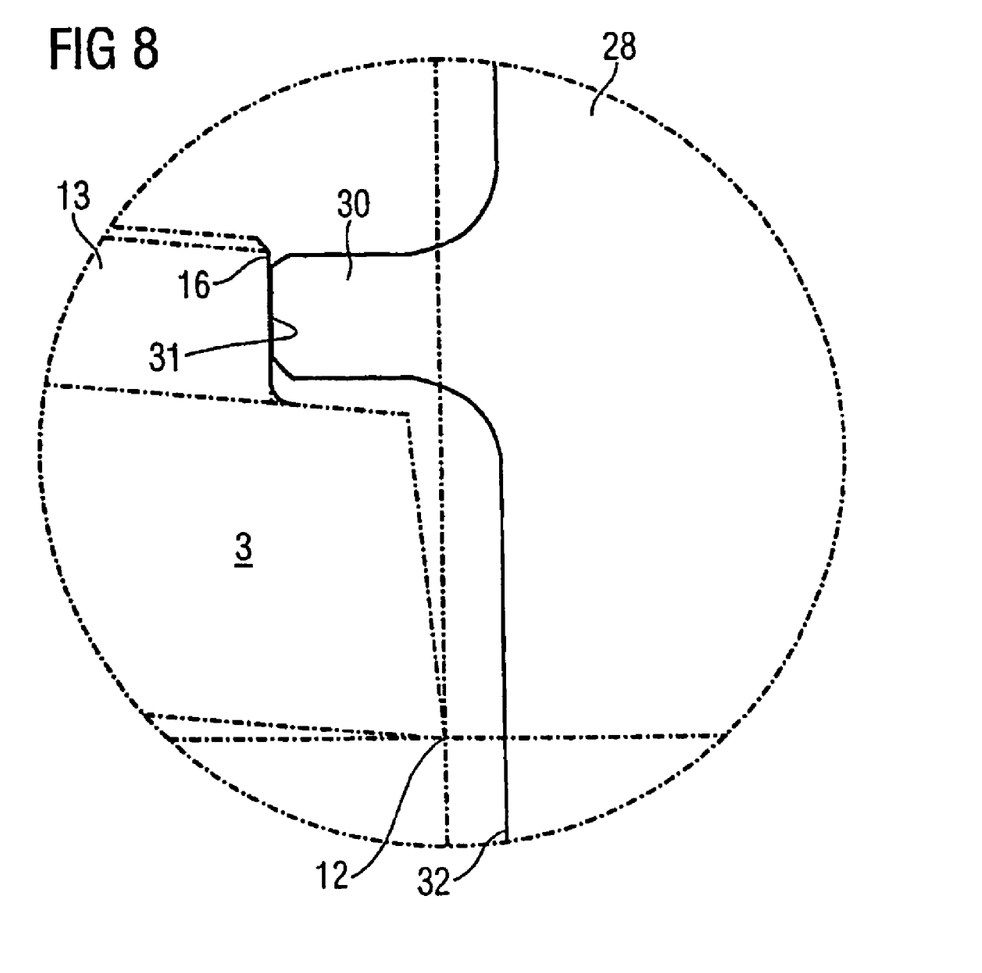
FIG. 8 is a detail VIII of FIG. 7 at an enlarged scale with a plane-parallel bearing of the plane-bearing tool on the geometrical bearing lug of the cutting plate according to at least one possible embodiment.

According to FIGS. 6 to 8, this axial angle $\beta$ guarantees in addition a plane-parallel bearing of a plane-bearing tool or positioning device 28. With the latter, the milling tool 1 is detachably fixed by means of an assembly screw 29 for positioning the cutting plates 3 on the tool base body 2. The positioning surfaces 31 of the bearing or stopping studs 30 of the plane-bearing tool 28 act at their front face on the bearing surface 16 of the geometrical bearing lug 13 of the respective cutting plate 3. These positioning surfaces 31 are parallel to the stopping surface 32 of the plane-bearing tool 28, although the individual cutting plates 3 in the tool base body 2 are axially inclined at the angle $\beta$.

As soon as the individual cutting plates 3 have been brought into a form fit with the associated clamping slots 19 in the tool base body 2 and have been exactly positioned by means of the plane-bearing tool 28, the double clamping wedges 4 can be screwed up, thus axially clamping the multi-edged cutting plates 3.

Figure 4A:
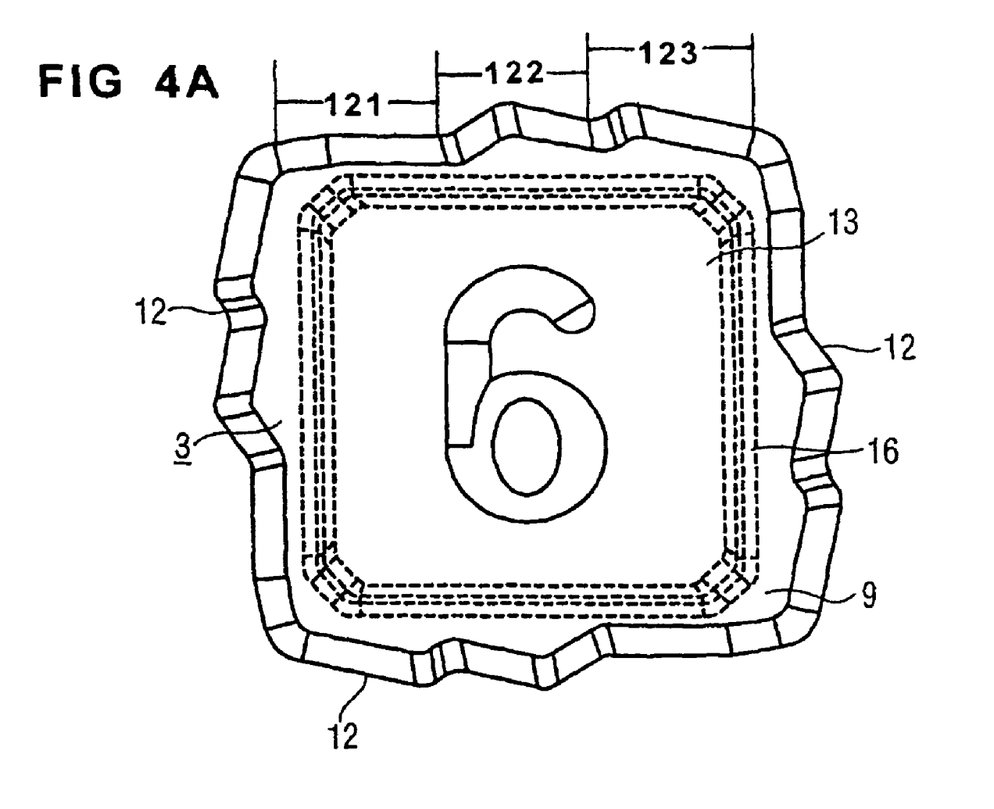
FIG. 4A is the view in FIG. 4 with additional detail according to at least one possible embodiment.

FIG. 4A details sections of one cutting edge 12. In the embodiment shown in FIG. 4A, the cutting edge 12 is divided into three general sections, which sections have been selected for purposes of example and to demonstrate the differing contours or surfaces of the cutting edge 12. It should be understood that cutting edge 12 could be divided into more or fewer sections in order to define the contours or surfaces. Section 121 is a substantially straight-edged section. Section 122 is a substantially angled section with substantially similar portions on either side of the transition area or peak or bend. Section 123 is a substantially angled section with substantially unequal or different portions on either side of the transition area or peak or bend. In the embodiment shown, each cutting edge 12 has exactly the same contour or contours, however, it should be understood that each cutting edge 12, in at least one other possible embodiment, could have a different contour or contours from the other cutting edges 12.

Figure 2A:
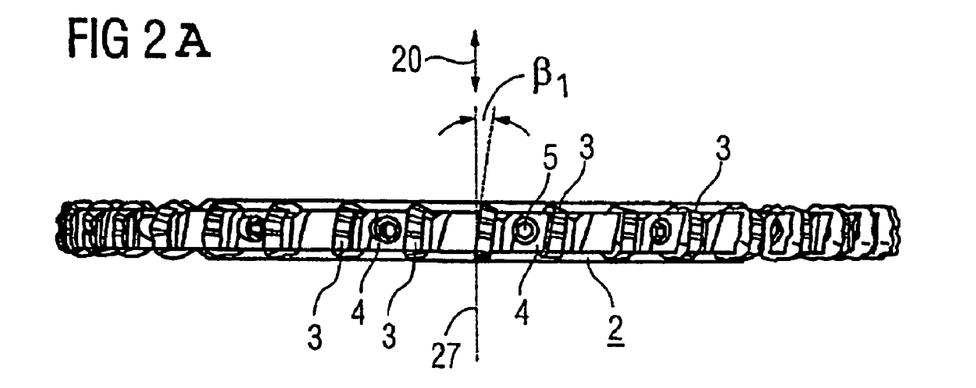
FIG. 2A is the view in FIG. 2 with additional detail according to at least one possible embodiment.
Figure 5A:
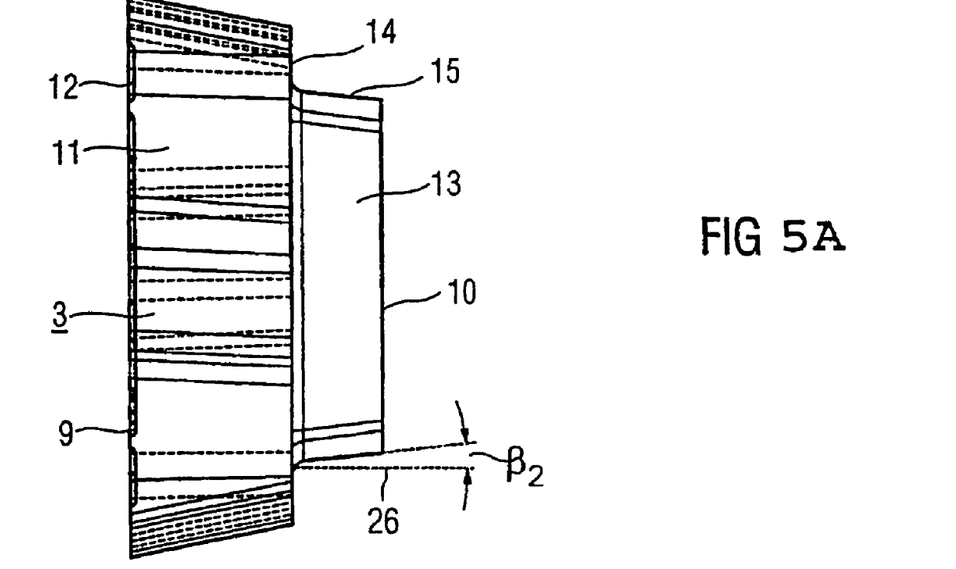
FIG. 5A is the view in FIG. 5 with additional detail according to at least one possible embodiment.

In the embodiments shown in FIGS. 2A and 5A, the lead angle $\beta_1$ and the axial angle $\beta_2$ can be different from one another and not equal. To achieve this difference, the cutting face side 9 of the cutting plate 3 could possibly be oriented such that the lead angle $\beta_1$ formed might differ from the axial angle $\beta_2$ by a degree or degrees or several degrees or many degrees, and by tenths of a degree or possibly hundredths of a degree within a range of degrees or several degrees or many degrees. Alternatively, the contour support 15 could be positioned such that the axial angle $\beta_2$ formed might differ from the lead angle $\beta_1$ by a degree or degrees or several degrees or many degrees, and by tenths of a degree or possibly hundredths of a degree within a range of degrees or several degrees or many degrees. In at least one other possible embodiment, the plane-bearing tool 28 could have angled positioning surfaces 31 on the bearing or stopping studs 30 in order to accommodate a contour support 15 that has a related axial angle $\beta_2$ that is different than the lead angle $\beta_1$.

Figure 5B:
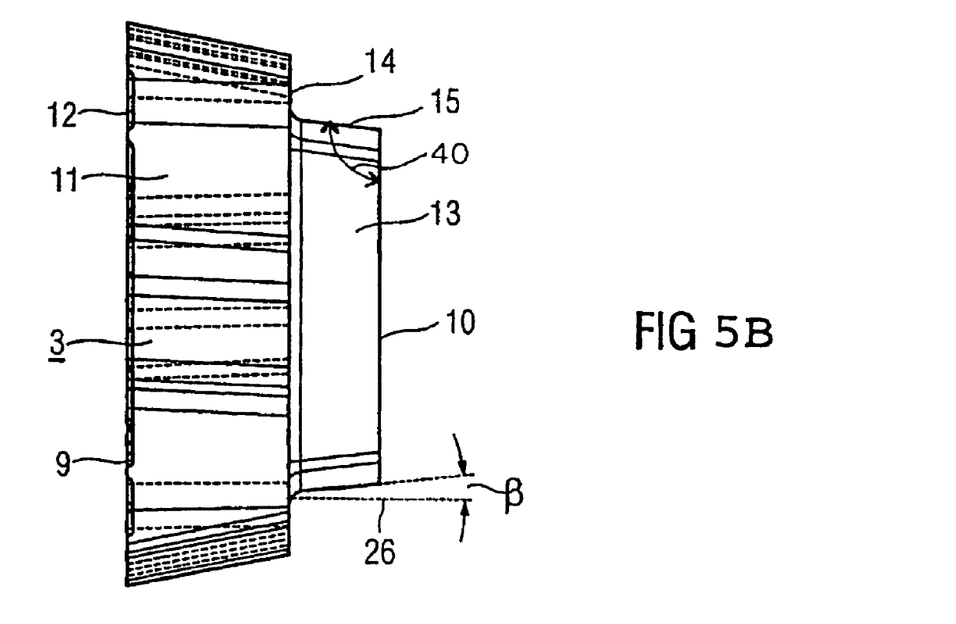
FIG. 5B is the view in FIG. 5 with additional detail according to at least one possible embodiment.
Figure 5C:
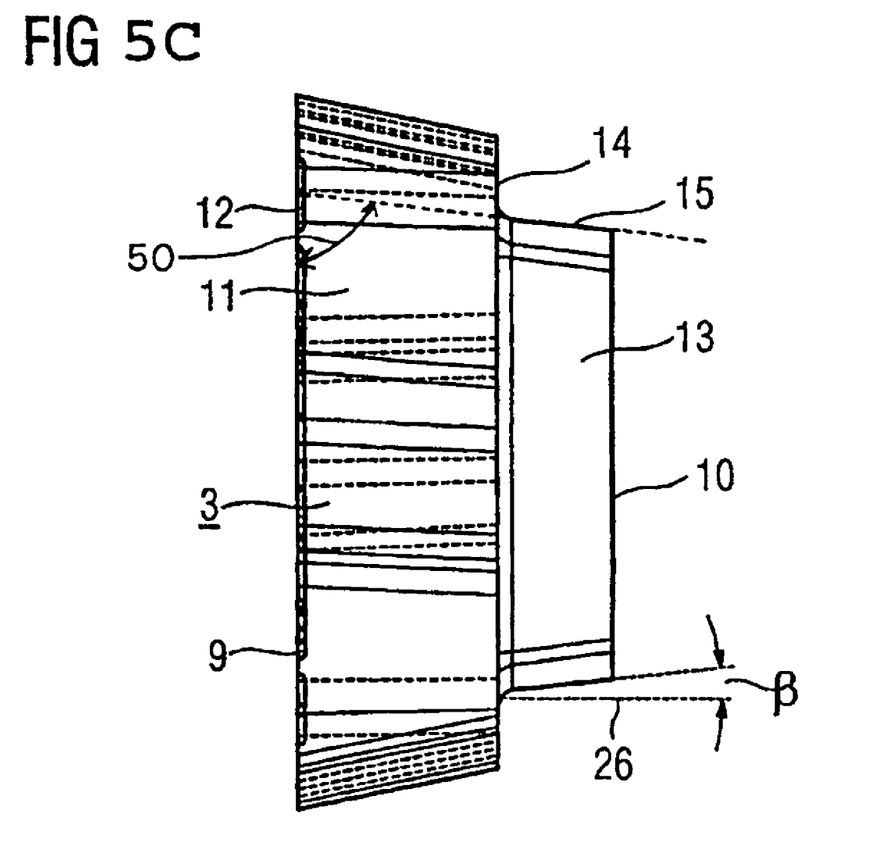
FIG. 5C is the view in FIG. 5 with additional detail according to at least one possible embodiment.

FIGS. 5B and 5C show angles 40 and 50, respectively. Angle 40 is the angle formed by the contour support 15 and the back surface 10. Angle 50 is the angle formed by a line running along the contour support 15 and the cutting face side 9. Angle 40, in at least one possible embodiment, can be in the range of 90° to 110°, such as 90°, 91°, 92°, 93°, 94°, 95°, 96°, 97°, 98°, 99°, 100°, 101°, 102°, 103°, 104°, 105°, 106°, 107°, 108°, 109°, or 110°, and values in between in tenths of a degree, or possibly even hundredths of a degree. Angle 50, in at least one possible embodiment, can be in the range of 70° to 90°, such as 70°, 71°, 72°, 73°, 74°, 75°, 76°, 77°, 78°, 79°, 80°, 81°, 82°, 83°, 84°, 85°, 86°, 87°, 88°, 89°, or 90°, and values in between in tenths of a degree, or possibly even hundredths of a degree.

In at least one possible embodiment, the cutting plate 3 is asymmetrical with respect to a line lying in the plane of the cutting-face side 9 and intersecting with the center point or central rotational axis of the cutting plate 3, or in other words, a line that bisects the cutting plate 3 into two asymmetrical halves. In another possible embodiment, the asymmetry of the cutting plate 3 refers to when each of the cutting edges 12 and/or lateral surfaces 11 are not similar and/or identical and present differing surface shapes and contours. By utilizing the geometrical bearing lug 13, which can have equivalent and/or identical contour supports or contour support surfaces 15, a cutting plate 3 having cutting edges 12 and/or lateral surfaces 11 having similar or different contours and surface shapes can be held in the tool body 2. In addition, a first set of cutting plates 3 having one configuration of cutting edges 12 and/or lateral surfaces 11 can be removed and replaced with a second set of cutting plates 3 having a different configuration, as long as each one of each set of cutting plates 3 has the same geometric bearing lug 13, in order to perform a different cutting operation with the same side milling cutter tool.

As can be seen in FIGS. 2 and 8, according to at least one possible embodiment, the contour support 15 that is contacted by the positioning surface 31 of the bearing stud 30 upon insertion of the cutting plate 3 into the tool body 2 lies in, or in a plane parallel to, the plane of rotation of the side milling cutter 1.

This application further relates to a milling tool 1 comprising a tool base body 2 and a number of cutting plates 3 held to said base body by means of a clamping element 4. The cutting plates each have a plate surface 9, 10 disposed in opposite planes and at least one lateral surface 11 forming a cutting edge 12 with a first plate surface 9. According to at least one possible embodiment, a geometrical bearing lug 13 protrudes from the cutting plate 3 opposite to the first plate surface 9 bringing the cutting plate 3 into a form fit with the corresponding contour support 16 in the tool base body 2.

One feature or aspect of an embodiment is believed at the time of the filing of this patent application to possibly reside broadly in a milling tool 1 comprising a tool base body 2 and a number of cutting plates 3 held to said base body by means of a clamping element 4, said cutting plates each having a plate surface 9, 10 disposed in opposite planes and at least one lateral surface 11 forming a cutting edge 12 with a first plate surface 9, a geometrical bearing lug 13 protruding from the cutting plate 3 opposite to the first plate surface 9 bringing the cutting plate 3 into a form fit with the corresponding contour support 16 in the tool base body 2, characterized in that the geometrical bearing lug 13 forms a contour bearing surface 15, which is crosswise, at an axial angle $\beta$ between 5° and 15°, to a back surface 10, which is parallel to the first plate surface 9.

Another feature or aspect of an embodiment is believed at the time of the filing of this patent application to possibly reside broadly in the milling tool, characterized by an axial angle $\beta$ between 6° and 10°, preferably (7±1°).

Yet another feature or aspect of an embodiment is believed at the time of the filing of this patent application to possibly reside broadly in the milling tool, characterized in that the clamping element 4 comprises a first clamping face 18 facing the first plate surface 10 of the cutting plate 3, to which a bearing surface 17a provided on a clamping web 17 of the tool base body 2 is opposite, under formation of a clamping slot 19 for the cutting plate 3, on which bearing surface 17a the back surface 10, formed by the geometrical bearing lug 13, of the cutting plate 3 abuts.

Still another feature or aspect of an embodiment is believed at the time of the filing of this patent application to possibly reside broadly in the milling tool, characterized by a clamping wedge as clamping element 4.

A further feature or aspect of an embodiment is believed at the time of the filing of this patent application to possibly reside broadly in the milling tool, characterized in that the clamping wedge 4 possesses an internal thread 5b for a threaded screw 5 guided in a threaded hole 7 of the tool base body 2.

Another feature or aspect of an embodiment is believed at the time of the filing of this patent application to possibly reside broadly in the milling tool, characterized in that the clamping element 4 is designed as a double clamping wedge with opposite clamping surfaces 18, 23.

Yet another feature or aspect of an embodiment is believed at the time of the filing of this patent application to possibly reside broadly in the milling tool, characterized by a first clamping surface 18 destined for clamping bearing on the first plate surface 9 of the cutting plate 3 and having a second clamping surface 23 opposite to the first clamping surface 18 for clamping bearing on the back surface 10, formed by the geometrical bearing lug 13, of another cutting plate 3.

Still another feature or aspect of an embodiment is believed at the time of the filing of this patent application to possibly reside broadly in the milling tool, characterized in that a first clamping surface 18 of the double clamping wedge 4 for clamping fixation of two cutting plates 3 abuts on the first plate surface 9 of a first cutting plate 3 and its opposite second clamping surface 23, on the back surface 10, formed by the geometrical bearing lug 13, of the second cutting plate 3.

A further feature or aspect of an embodiment is believed at the time of the filing of this patent application to possibly reside broadly in the milling tool, characterized in that the second clamping surface 23 of the double clamping wedge 4 is opposite to a bearing surface 24 provided on an clamping web 17 of the tool base body 2, forming a clamping slot 19' for the second cutting plate 3, on which bearing face 24 the first plate surface 9 of the second cutting plate 3 abuts.

Another feature or aspect of an embodiment is believed at the time of the filing of this patent application to possibly reside broadly in the milling tool, characterized by: a multi-edged cutting plate 3 with an asymmetric cutting-face side 9 and with a number of lateral surfaces 11, forming with the cutting-face side 9 a number of cutting edges 12 corresponding to the number of lateral surfaces 11, and a polygonal geometrical bearing lug 13 on the plate rear side 14, which is opposite to the cutting-face side 9, for forming a number of plane bearing surfaces 15 corresponding to the number of cutting edges 12.

Yet another feature or aspect of an embodiment is believed at the time of the filing of this patent application to possibly reside broadly in a multi-edged cutting plate 3 for the milling tool, characterized by a dome-like bearing lug 13 which protrudes from the plate rear side 14 and which is in particular at least approximately square.

Still another feature or aspect of an embodiment is believed at the time of the filing of this patent application to possibly reside broadly in a multi-edged cutting plate 3 for the milling tool.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the German Office Action dated Feb. 23, 2005, for the corresponding German Application No. 20 2004 010 630.2, and/or cited elsewhere are hereby incorporated by reference as if set forth in their entirety herein as follows: DE 197 27 872 A1; DE 25 49 930 A1; DE 25 49 757 A1; and WO 03/033195 A1. All of the patents, patent applications or patent publications, which were cited in the International Search Report dated Oct. 10, 2005, for the corresponding International Application No. PCT/EP2005/007029, and/or cited elsewhere are hereby incorporated by reference as if set forth in their entirety herein as follows: U.S. Pat. No. 3,742,565 A; EP 0 827 818 A; JP 08 206910 A; DE 34 13 615 A1; and U.S. Pat. No. 4,529,338 A.

The corresponding foreign and international patent publication applications, namely, Federal Republic of Germany Patent Application No. 20 2004 010 630.2, filed on Jul. 6, 2004, having inventors Franz PRILLER and Alfred SLADEK, and DE-OS 20 2004 010 630.2 and DE-PS 20 2004 010 630.2, and International Application No. PCT/EP2005/007029, filed Jun. 30, 2005, having WIPO Publication No. WO 2006/002906 A1 and inventors Franz PRILLER and Alfred SLADEK, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A stone-drill-manufacturing, side milling cutter to manufacture stone drills, said side milling cutter comprising:
    a disk-shaped body having a central rotational axis;
    a plurality of cutting inserts;
    said disk-shaped body comprising a plurality of receiving pockets disposed on the periphery of said disk-shaped body;
    each of said receiving pockets being configured and disposed to receive a pair of cutting inserts therein;
    a plurality of clamping elements, each being configured to be disposed between a pair of said cutting inserts to clamp the cutting inserts into a receiving pocket;
    each of said cutting inserts comprising a cutting plate;
    said cutting plate comprising:
        a plate surface;
        a rear surface being disposed opposite and parallel to said plate surface;
        a plurality of lateral side surfaces being disposed transverse to and to connect said plate surface and said rear surface; and
        a plurality of cutting edges being formed by the intersection of said plate surface and said plurality of lateral side surfaces;
    each of said cutting inserts comprising a bearing lug projecting and extending away from said rear surface of said cutting plate;
    said bearing lug comprising:
        a back surface being disposed opposite and parallel to said plate surface of said cutting plate;
        a plurality of side bearing surfaces being disposed transverse to and to connect said back surface to said rear surface of said cutting plate; and
        the number of said plurality of side bearing surfaces being the same as the number of said plurality of cutting edges;
    each of said receiving pockets comprising:
        a first side surface;
        a second side surface being disposed opposite said first side surface; and
        a bottom surface being disposed substantially transverse to and to connect said first side surface and said second side surface;
    each of said receiving pockets being configured to receive a pair of cutting inserts, wherein upon insertion of said pair of cutting inserts, said back surface of said bearing lug of a first cutting insert of the pair of cutting inserts is disposed to contact said first side surface of said receiving pocket, and said plate surface of said cutting plate of a second cutting insert of the pair of cutting inserts is disposed to contact said second side surface of said receiving pocket, which second cutting insert precedes the first cutting insert in the direction of rotation of the disk-shaped body during cutting;
    each of said clamping elements being configured to be disposed to contact said plate surface of said cutting plate of the first cutting insert of the pair of cutting inserts and to contact said back surface of said bearing lug of the second cutting insert of the pair of cutting inserts to clamp the cutting inserts into the receiving pocket;
    each of said receiving pockets comprising a step-like projection being disposed between said first side surface and said bottom surface;
    said step-like projection comprising a bearing support surface being configured to contact and support a side bearing surface of said bearing lug of the first cutting insert of the pair of cutting inserts;
    a substantially disk-shaped positioning device being configured to be disposed parallel and coaxial to said disk-shaped body;
    said positioning device comprising a plurality of stopping studs corresponding to each of said plurality of cutting inserts;
    each of said stopping studs comprising a positioning surface being disposed parallel to the plane of rotation of said disk-shaped body;
    each of said positioning surfaces being configured to be disposed to contact a side bearing surface of a corresponding cutting insert upon insertion of the cutting insert into a corresponding receiving pocket in a direction substantially parallel to the central axis of rotation of said disk-shaped body to stop and position each cutting insert in a desired position in its corresponding receiving pocket;
    each of said receiving pockets being configured to position each of said cutting inserts such that said plate surface of said cutting plate of each of said cutting inserts is disposed at a first angle with respect to a plane intersecting the central rotational axis of said disk-shaped body and one of said cutting edges, said first angle being between 5° and 15°; and said side bearing surfaces of said bearing lug of each of said cutting inserts being disposed, with respect to said plate face of each of said cutting inserts, at a second angle of between 75° and 85°, which second angle is complementary said first angle such that the angles add up to 90°, and which angular position permits the side bearing surface in contact with its corresponding positioning surface upon insertion of its cutting insert to be parallel to its corresponding positioning surface and the plane of rotation of said disk-shaped body.

2. The side milling cutter as claimed in claim 1, wherein: each clamping element comprises a clamping wedge; and said second angle is between 80° and 84°.

3. The side milling cutter as claimed in claim 2, wherein: each of said clamping wedges comprises a threaded shank portion;
said disk-shaped body comprises a plurality of threaded holes corresponding to said plurality of clamping wedges; and
each of said clamping wedges is configured and to be screwed into its corresponding threaded hole.

4. A method of manufacturing a stone drill with a stone-drill-manufacturing, side milling cutter comprising: a disk-shaped body having a central rotational axis; a plurality of cutting inserts; said disk-shaped body comprising a plurality of receiving pockets disposed on the periphery of said disk-shaped body; each of said receiving pockets being configured and disposed to receive a pair of cutting inserts therein; a plurality of clamping elements, each being configured to be disposed between a pair of said cutting inserts to clamp the cutting inserts into a receiving pocket; each of said cutting inserts comprising a cutting plate; said cutting plate comprising: a plate surface; a rear surface being disposed opposite and parallel to said plate surface; a plurality of lateral side surfaces being disposed transverse to and to connect said plate surface and said rear surface; and a plurality of cutting edges being formed by the intersection of said plate surface and said plurality of lateral side surfaces; each of said cutting inserts comprising a bearing lug projecting and extending away from said rear surface of said cutting plate; said bearing lug comprising: a back surface being disposed opposite and parallel to said plate surface of said cutting plate; a plurality of side bearing surfaces being disposed transverse to and to connect said back surface to said rear surface of said cutting plate; and the number of said plurality of side bearing surfaces being the same as the number of said plurality of cutting edges; each of said receiving pockets comprising: a first side surface; a second side surface being disposed opposite said first side surface; and a bottom surface being disposed substantially transverse to and to connect said first side surface and said second side surface; each of said receiving pockets being configured to receive a pair of cutting inserts, wherein upon insertion of said pair of cutting inserts, said back surface of said bearing lug of a first cutting insert of the pair of cutting inserts is disposed to contact said first side surface of said receiving pocket, and said plate surface of said cutting plate of a second cutting insert of the pair of cutting inserts is disposed to contact said second side surface of said receiving pocket, which second cutting insert precedes the first cutting insert in the direction of rotation of the disk-shaped body during cutting; each of said clamping elements being configured to be disposed to contact said plate surface of said cutting plate of the first cutting insert of the pair of cutting inserts and to contact said back surface of said bearing lug of the second cutting insert of the pair of cutting inserts to clamp the cutting inserts into the receiving pocket; each of said receiving pockets comprising a step-like projection being disposed between said first side surface and said bottom surface; said step-like projection comprising a bearing support surface being configured to contact and support a side bearing surface of said bearing lug of the first cutting insert of the pair of cutting inserts; a substantially disk-shaped positioning device being configured to be disposed parallel and coaxial to said disk-shaped body; said positioning device comprising a plurality of stopping studs corresponding to each of said plurality of cutting inserts; each of said stopping studs comprising a positioning surface being disposed parallel to the plane of rotation of said disk-shaped body; each of said positioning surfaces being configured to be disposed to contact a side bearing surface of a corresponding cutting insert upon insertion of the cutting insert into a corresponding receiving pocket in a direction substantially parallel to the central axis of rotation of said disk-shaped body to stop and position each cutting insert in a desired position in its corresponding receiving pocket; each of said receiving pockets being configured to position each of said cutting inserts such that said plate surface of said cutting plate of each of said cutting inserts is disposed at a first angle with respect to a plane intersecting the central rotational axis of said disk-shaped body and one of said cutting edges, said first angle being between 5° and 15°; and said side bearing surfaces of said bearing lug of each of said cutting inserts being disposed, with respect to said plate face of each of said cutting inserts, at a second angle of between 75° and 85°, which second angle is complementary said first angle such that the angles add up to 90°, and which angular position permits the side bearing surface in contact with its corresponding positioning surface upon insertion of its cutting insert to be parallel to its corresponding positioning surface and the plane of rotation of said disk-shaped body, said method comprising the steps of:

inserting a clamping element into each of said receiving pockets of said disk-shaped body;
inserting a pair of cutting inserts, one on either side of the corresponding clamping element, into each of said receiving pockets by sliding the cutting inserts in from the side of said disk-shaped body along a direction substantially parallel to the central rotational axis of said disk-shaped body;
contacting a side bearing surface of each of said cutting inserts against a positioning surface of a corresponding stopping stud of said positioning device and stopping and positioning each of said cutting inserts in a desired position in a corresponding receiving pocket;
tightening said clamping elements and securely clamping each pair of cutting inserts into their corresponding receiving pockets;
moving said positioning device away from said disk-shaped body;
attaching said disk-shaped body to a rotational drive arrangement configured to rotate said disk-shaped body; and
rotating said disk-shaped body and cutting at least one chip flute into a workpiece to manufacture a stone drill.

5. The method as claimed in claim 4, wherein: each of said clamping wedges comprises a threaded shank portion; said disk-shaped body comprises a plurality of threaded holes corresponding to said plurality of clamping wedges; and each of said clamping wedges is configured and to be screwed into its corresponding threaded hole, said method further comprises the step of:

inserting said clamping wedges into said disk-shaped body by screwing said threaded shank portions into corresponding threaded holes.

6. A milling cutter comprising:
a base body;
a plurality of cutting inserts;
a plurality of clamping elements being configured and disposed to hold said cutting inserts in said base body;
each of said cutting inserts comprising a cutting plate;
said cutting plate comprising:
  a first plate surface; and
  at least one lateral surface being disposed to form at least one cutting edge with said first plate surface;
each of said cutting inserts comprising a geometrical bearing lug being disposed to protrude from said cutting plate opposite to said first plate surface;
said bearing lug comprising:
  a back surface being disposed opposite said first plate surface; and
  a contour bearing surface;
each of said receiving pockets comprising a contour support corresponding to said contour bearing surface;
said contour support being configured and disposed to engage said contour bearing surface in a form fit; and
said contour bearing surface being disposed at a first angle with respect to said first plate surface of between 75° and 85°.

7. The milling cutter as claimed in claim 6, wherein the first angle is between 80° and 84°.

8. The milling cutter as claimed in claim 7, wherein the first angle is between 82° and 84°.

9. The milling cutter as claimed in claim 8, wherein:
each clamping element comprises a first clamping surface being configured and disposed to face said first plate surface of said cutting plate of a corresponding cutting insert;
said disk-shaped body comprises a plurality of clamping webs disposed between and to form the sides of each of said receiving pockets;
each receiving pocket comprises a first side bearing surface provided on a clamping web;
said first side bearing surface and said clamping element together define a clamping slot configured to receive a cutting insert therein; and
said back surface of said bearing lug is configured and disposed to abut against said first side bearing surface.

10. The milling cutter as claimed in claim 9, wherein each clamping element comprises a clamping wedge.

11. The milling cutter as claimed in claim 10, wherein:
each of said clamping wedges comprises a threaded shank portion;
said disk-shaped body comprises a plurality of threaded holes corresponding to said plurality of clamping wedges; and
each of said clamping wedges is configured and disposed to be screwed into its corresponding threaded hole.

12. The milling cutter as claimed in claim 11, wherein each of said clamping wedges comprises a double clamping wedge with first and second clamping surfaces disposed opposite one another.

13. The milling cutter as claimed in claim 12, wherein:
said first clamping surface of each of said clamping wedges is configured to contact said plate surface of said cutting plate of a first corresponding cutting insert; and
said second clamping surface of each of said clamping wedges is configured to contact said back surface of said bearing lug of a second corresponding cutting insert.

14. The milling cutter as claimed in claim 13, wherein:
said first clamping surface of each of said clamping wedges is disposed in contact with said plate surface of said cutting plate of said first corresponding cutting insert;
said second clamping surface of each of said clamping wedges is disposed in contact with said back surface of said bearing lug of said second corresponding cutting insert; and
each of said clamping wedges is configured and disposed to clamp both said first and second corresponding cutting inserts into a corresponding receiving pocket.

15. The milling cutter as claimed in claim 14, wherein:
each receiving pocket comprises a second side bearing surface disposed opposite said first side bearing surface and provided on a clamping web;
said second side bearing surface and said clamping element together define a second clamping slot configured to receive said second corresponding cutting insert therein; and
said first plate surface of said cutting plate of said second corresponding cutting insert is configured and disposed to abut against said second side bearing surface.

16. The milling cutter as claimed in claim 15, wherein:
said cutting plate comprises:
  a second plate surface disposed opposite said first plate surface;
  a plurality of lateral surfaces disposed between and to connect said first plate surface and said second plate surface; and
  a plurality of cutting edges corresponding to the number of lateral surfaces;
said first plate surface is asymmetric;
said geometrical bearing lug comprises a polygonal geometrical bearing lug disposed to extend from said second plate surface of said cutting plate; and
said bearing lug comprises a plurality of contour bearing surfaces corresponding to the number of cutting edges.

17. The milling cutter as claimed in claim 6, wherein:
said cutting plate comprises:
  a second plate surface disposed opposite said first plate surface;
  a plurality of lateral surfaces disposed between and to connect said first plate surface and said second plate surface; and
  a plurality of cutting edges corresponding to the number of lateral surfaces;
said first plate surface is asymmetric;
said geometrical bearing lug comprises a polygonal geometrical bearing lug disposed to extend from said second plate surface of said cutting plate; and
said bearing lug comprises a plurality of contour bearing surfaces corresponding to the number of cutting edges.

18. A cutting insert for a milling cutter, said cutting insert comprising:
a cutting plate comprising:
  a first plate surface; and
  at least one lateral surface being disposed to form at least one cutting edge with said first plate surface;
a geometrical bearing lug being disposed to protrude from said cutting plate opposite to said first plate surface; and
said bearing lug comprising:
  a back surface being disposed opposite said first plate surface; and
  a contour bearing surface;

said contour bearing surface being configured and disposed to engage in a form fit with a contour support surface of a receiving pocket of a body of a milling cutter; and said contour bearing surface being disposed at a first angle with respect to said first plate surface of between 75° and 85°.

19. The cutting insert according to claim 18, wherein said bearing lug has an approximately square shape.

20. The cutting insert according to claim 19, wherein said first angle is between 80° and 84°.

* * * * *

UNITED STATES PATENT AND TRADEMARK OFFICE
CERTIFICATE OF CORRECTION

| | | |
|---|---|---|
| PATENT NO. | : 7,976,249 B2 | Page 1 of 1 |
| APPLICATION NO. | : 11/620412 | |
| DATED | : July 12, 2011 | |
| INVENTOR(S) | : Franz Priller et al. | |

It is certified that error appears in the above-identified patent and that said Letters Patent is hereby corrected as shown below:

IN THE SPECIFICATION

In Column 3, Line 66, delete "patentably" and insert -- patentable --, therefor.

Signed and Sealed this
Ninth Day of April, 2013

Teresa Stanek Rea
*Acting Director of the United States Patent and Trademark Office*